United States Patent
Ferenczi et al.

(10) Patent No.: US 11,728,672 B2
(45) Date of Patent: Aug. 15, 2023

(54) SAFETY PROCEDURE, DEVICE FOR THE IMPLEMENTATION THEREOF, AND HYBRID OR ELECTRIC VEHICLE

(71) Applicant: Bayerische Motoren Werke Aktiengesellschaft, Munich (DE)

(72) Inventors: Izabella Ferenczi, Munich (DE); Lluis Roig, Munich (DE); Andreas Rucker, Augsburg (DE); Constantin Ferdinand Roesler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 14 days.

(21) Appl. No.: 16/411,238

(22) Filed: May 14, 2019

(65) Prior Publication Data

US 2019/0263265 A1 Aug. 29, 2019

Related U.S. Application Data

(63) Continuation of application No. PCT/EP2017/078401, filed on Nov. 7, 2017.

(30) Foreign Application Priority Data

Nov. 15, 2016 (DE) ..................... 10 2016 222 340.2

(51) Int. Cl.
*H02P 25/14* (2006.01)
*H02P 3/14* (2006.01)
(Continued)

(52) U.S. Cl.
CPC .............. *H02J 7/345* (2013.01); *B60L 3/003* (2013.01); *B60L 3/0046* (2013.01);
(Continued)

(58) Field of Classification Search
CPC ............................... H02K 11/05; H02P 25/22
See application file for complete search history.

(56) References Cited

U.S. PATENT DOCUMENTS

2008/0151454 A1* 6/2008 Uhl ........................ B60R 21/01
361/87
2012/0062029 A1 3/2012 Fukuyama et al.
(Continued)

FOREIGN PATENT DOCUMENTS

CN 102398523 A 4/2012
CN 103383430 A 11/2013
(Continued)

OTHER PUBLICATIONS

International Search Report (PCT/ISA/210) issued in PCT Application No. PCT/EP2017/078401 dated Feb. 26, 2018 with English translation (six (6) pages).
(Continued)

*Primary Examiner* — Muhammad S Islam
*Assistant Examiner* — Charles S Laughlin
(74) *Attorney, Agent, or Firm* — Crowell & Moring LLP

(57) ABSTRACT

A safety procedure is provided for a vehicle having high-current components and high-voltage components, in particular in a hybrid or electric vehicle. In the event of a crash, in addition to a physical separation of a battery from a HV intermediate circuit, the HV intermediate circuit is discharged.

10 Claims, 3 Drawing Sheets

(51) Int. Cl.
*H02P 5/69* (2006.01)
*H02J 7/34* (2006.01)
*B60L 3/00* (2019.01)
*B60L 3/04* (2006.01)
*H02J 7/00* (2006.01)
*B60L 50/51* (2019.01)

(52) U.S. Cl.
CPC .............. *B60L 3/0061* (2013.01); *B60L 3/04* (2013.01); *H02J 7/0031* (2013.01); *B60L 50/51* (2019.02)

(56) References Cited

U.S. PATENT DOCUMENTS

| | | | |
|---|---|---|---|
| 2013/0179012 A1* | 7/2013 | Hermann | B60L 58/22 |
| | | | 700/275 |
| 2013/0181645 A1 | 7/2013 | Kopken et al. | |
| 2013/0234510 A1 | 9/2013 | Nakamura | |
| 2013/0293248 A1 | 11/2013 | Ho et al. | |
| 2014/0015316 A1 | 1/2014 | Schoenknecht | |
| 2014/0043034 A1* | 2/2014 | Hemon | G01R 31/64 |
| | | | 324/503 |
| 2015/0217764 A1 | 8/2015 | Hoshiba | |
| 2016/0114695 A1* | 4/2016 | Holgers | B60L 3/0046 |
| | | | 903/907 |
| 2016/0226410 A1* | 8/2016 | Lopez De Arroyabe | |
| | | | B60L 7/003 |
| 2017/0297612 A1* | 10/2017 | Uryu | H02P 6/12 |

FOREIGN PATENT DOCUMENTS

| | | |
|---|---|---|
| CN | 103444070 A | 12/2013 |
| CN | 104582988 A | 4/2015 |
| DE | 10 2004 019 817 A1 | 11/2005 |
| DE | 10 2009 039 913 A1 | 6/2010 |
| DE | 10 2011 080 058 A1 | 1/2013 |
| DE | 10 2013 226 763 A1 | 6/2015 |
| EP | 2 548 757 A1 | 1/2013 |
| IN | 283MUM2013 A1 | 6/2015 |

OTHER PUBLICATIONS

German-language Written Opinion (PCT/ISA/237) issued in PCT Application No. PCT/EP2017/078401 dated Feb. 26, 2018 (six (6) pages).

German-language Search Report issued in counterpart German Application No. 102016222340.2 dated Aug. 31, 2017 with partial English translation (13 pages).

Chinese-language Office Action issued in Chinese Application No. 201780053119.7 dated May 12, 2022 with English translation (19 pages).

* cited by examiner

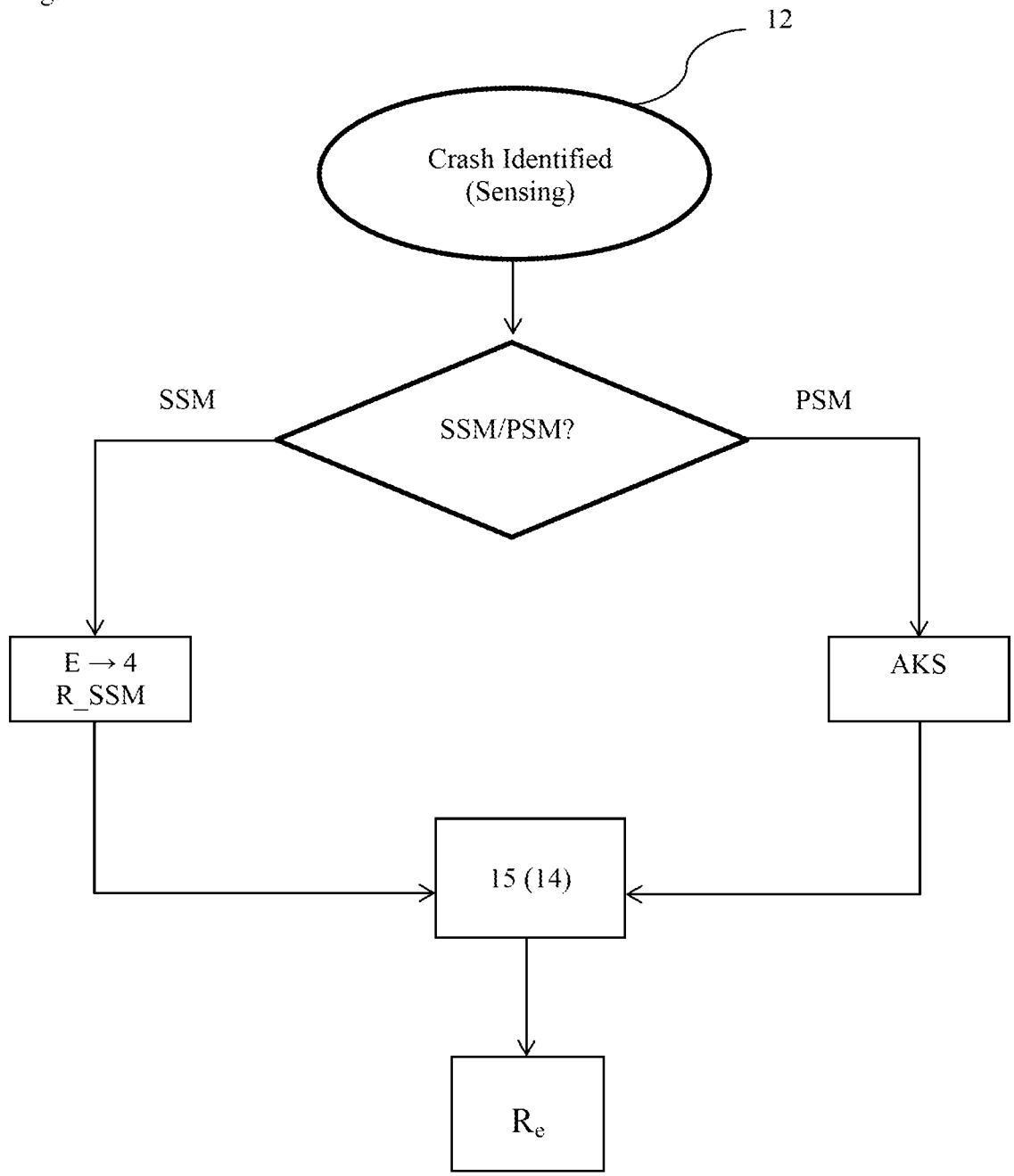

SAFETY PROCEDURE, DEVICE FOR THE IMPLEMENTATION THEREOF, AND HYBRID OR ELECTRIC VEHICLE

CROSS REFERENCE TO RELATED APPLICATIONS

This application is a continuation of PCT International Application No. PCT/EP2017/078401, filed Nov. 7, 2017, which claims priority under 35 U.S.C. § 119 from German Patent Application No. 10 2016 222 340.2, filed Nov. 15, 2016, the entire disclosures of which are herein expressly incorporated by reference.

BACKGROUND AND SUMMARY OF THE INVENTION

The present invention relates to a safety method, to an apparatus for the implementation thereof in a vehicle with heavy current and high-voltage components, in particular a hybrid or electric vehicle, and to a hybrid or electric vehicle.

It is known from the prior art that, in hybrid, hydrogen and electric vehicles, heavy-current and high-voltage components (HV components), such as, for example, inverters, charging devices, air-conditioning compressors, electrical heating systems, DC/DC converters, HV distributors or HV main lines and cable harnesses, are not arranged in crash regions of such vehicles without suitable protective measures. Without further countermeasures, damage to said HV components can lead to thermal events or fire, contact between occupants or rescue workers and HV potential or electric shock and/or to a failure of vehicle-internal crash, protection or emergency functions through HV contact with low-voltage component parts or the signal on-board power supply system. Particular mechanical protection of said components is provided as a conventional protective measure, wherein additional weight is accepted, and particularly critical components of the aforementioned type are generally located in the center of the vehicle or are not positioned in exposed regions.

Owing, among other things, to significant restriction of the possibilities of spatial arrangement of components within a vehicle, such a vehicle crash concept ensures as far as possible that the HV components are not destroyed in the event of a crash. The HV components are protected by the vehicle structure and/or are themselves accordingly designed so as to be robust and able to be mechanically loaded.

The prior art discloses various safety methods that cause a physical isolation of an electric battery or a storage battery from the rest of the network or high-voltage system upon sensing an accident. To detach the high-voltage system (HVS), a contractor or a pyrotechnic element is provided. According to the teaching of DE 10 2004 019 817 A1, pyrotechnic fuses are already used to protect electrical loads from excessive currents and to disconnect the battery in the case of a dangerous fault and in the case of a crash. IN2013MUM00283 A1 proposes an insulating isolation of the storage battery by way of a pyrotechnic switch in the event of ingressing water, fire or during an accident.

Furthermore, it has been proposed to disconnect the high-voltage system independently of the triggering of occupant protection systems. In this case, the control devices of the HV system and of the airbag system are connected to different logic units. DE 10 2009 039 913 A1 moreover proposes providing a separate control device with associated sensor inputs for improvement of the disconnection of a high-voltage system in a vehicle. This creates a basic independency with respect to said disconnection, for example, from a control device for airbags that sets other priorities.

The aim of the present invention is to provide a safety method and an apparatus for the implementation thereof and a vehicle of the above-mentioned type that further increases safety, in particular, in the event of a crash.

This and other objects are achieved according to the invention by way of a safety method wherein, in addition to a physical isolation of the storage battery, of a fuel cell or of another source for electrical energy, from a HV intermediate circuit that converts and distributes electrical energy within the vehicle, precisely this HV intermediate circuit is discharged in a targeted manner after the disconnection. A source for electrical energy is understood in the context of the present invention to mean stores that have a total energy content of several kWh. A source for electrical energy is, for example, storage battery packs of the BMW model i3, which have a total energy content of approximately 19 kWh.

A protective apparatus according to the present invention accordingly provides an isolating apparatus for physically isolating the storage battery as a store of electrical energy (or a fuel cell or another source for electrical energy) from a HV intermediate circuit, wherein, upon isolation from the storage battery, the HV intermediate circuit is connected to a discharge apparatus.

A basis of the present invention is thus the knowledge that pure isolation from the storage battery or electrical energy source on the one hand and high-voltage intermediate circuit on the other hand is insufficient, since too many electrically charged components are present in the high-voltage intermediate circuit and/or electrical energy can again be fed to the high-voltage intermediate circuit by the electric motor in the generator operating state. Energy stored in the intermediate circuit and, in particular, in the region of an inverter could be critical in the event of a short circuit without prior discharging, since, in the course of accident-related deformations of a body of a vehicle associated with damage to a constituent part of the high-voltage intermediate circuit, in particular, risks due to electric shock or fire in the vehicle cannot be excluded. Therefore, an advanced and very effective countermeasure is proposed in accordance with the invention by way of the targeted discharging of the high-voltage intermediate circuit.

In a preferred embodiment of the invention, positive and negative potentials of the HV intermediate circuit are connected to one another by way of a discharge apparatus. In a particularly preferred embodiment of the invention, the discharge apparatus is in the form of a high-current-resistant discharge resistor, which has an only very low magnitude of an electrical resistance for rapid discharging.

In one development of the invention, the discharge apparatus is arranged in a conducting or connecting manner between positive and negative potentials of the HV intermediate circuit, in particular in the region of an inverter.

The isolating apparatus is preferably embodied as a fuse, semiconductor element or high-current switch. However, an isolating apparatus is particularly preferably in the form of a pyrotechnically triggered fuse. Fuses of this kind cause a physical isolation in a shorter time than high-current switches, for example in the design of contactors.

In one development of a safety method according to the invention, in a preparation step before the physical isolation of a storage battery from a HV intermediate circuit (and in particular an inverter as a constituent part of the HV intermediate circuit), energy stored in a magnetic field of the motor/generator unit is particularly preferably transmitted to the storage battery by the HV intermediate circuit.

In one development of the invention, in the event of the use of a permanent-magnet synchronous machine as the motor/generator unit, an active short circuit is also established, by way of which feedback of mechanical energy converted to electrical energy is prevented. An active short circuit is accordingly provided in a region of the HV intermediate circuit associated with the motor/generator unit.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4 shows a flow chart for disconnection depending on a type of a respective electric motor.

DETAILED DESCRIPTION OF THE DRAWINGS

The same reference signs are always used for identical elements across the various figures. In this case, without restriction, only a use in a vehicle with electrical energy supply from a storage battery is considered hereinbelow.

Figure 1:
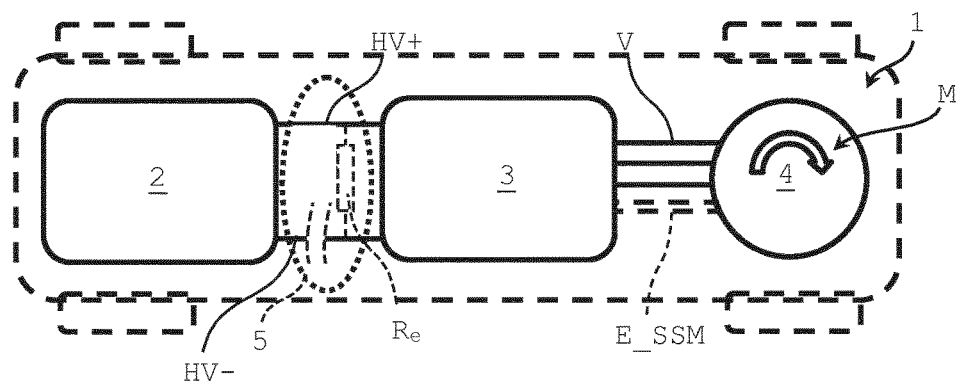
FIG. 1 is a block circuit diagram of a basic design of an electrical energy supply system in a hybrid or electric vehicle.

FIG. 1 shows a block circuit diagram of a basic design of an electrical energy supply system in a hybrid or electric vehicle 1 known from the prior art. In said figure, in a highly simplified illustration, a battery or a storage battery 2 is connected to a high-voltage intermediate circuit 3 by way of high-voltage potentials HV+, HV− or corresponding terminals and to an electric drive motor 4 or generator by way of said high-voltage intermediate circuit. While the role of the storage battery 2 as a general energy supply and store of braking energy obtained through recuperation is presented briefly, the role of the high-voltage intermediate circuit 3 is significantly more complex. The high-voltage intermediate circuit 3 represents more than just a connecting element between the storage battery 2 and the motor/generator unit 4. The tasks of the high-voltage intermediate circuit 3 are diverse, especially since it has to correctly actuate the motor/generator unit 4 depending on its type of operation and has to distribute electrical energy within the entire vehicle according to the different requirements of assemblies and has to monitor said energy. In addition, in the case of the use of a current-excited synchronous machine SSM, an excitation current E_SSM also has to be provided by the high-voltage intermediate circuit 3 for rotors of the current-excited synchronous machine SSM, whereas a stator of the motor/generator unit 4 is supplied with electrical energy via supply lines V.

In the case of an accident, according to the prior art, only an isolation from the storage battery 2 and the high-voltage intermediate circuit 3 is provided. This is intended to prevent the storage battery from coming into electrically conductive contact, for example, with components of the body, etc. in the course of accident-related progressing instances of damage and deformations of the vehicle 1. This would result in high current flows with a risk of fire and could lead to an electric shock even for the vehicle occupants.

According to the invention, it is now recognized that a pure electrically insulating isolation of the storage battery 2 and the high-voltage or HV intermediate circuit 3 is substantially insufficient for the following reasons:

1. The high-voltage intermediate circuit 3 consists of numerous electrical component parts, by way of which high voltages can be stored. Even after disconnection of the storage battery 2, due to accident-related deformations, these voltages can also furthermore cause instances of damage resulting in high current flows or electric shocks.

2. Due to an accident, mechanical energy M stored in the motor/generator unit 4 cannot be diverted immediately. The mechanical energy M present due to a steady rotor rotational speed is instead converted by the generator to electrical energy E and fed to the high-voltage intermediate circuit 3.

Even if a system with a crash sensor system and rapid isolation of the HV system from the storage battery 2 were implemented, the HV system has still stored energy E in the HV intermediate circuit 3, for example in the capacitors of the inverter. Said energy E from the intermediate circuit is sufficiently high to present a risk of short circuits to a low-voltage or signal on-board power supply system. In addition, HV components must not be destroyed even in the context of an accident when a continuing danger inter alia for the occupants could be triggered thereby. A crash-safe design and arrangement derived from this condition requires a lot of installation space, costs and also a corresponding additional weight due to a kind of plating. Either the vehicle structure or the components have to be embodied to be more robust or the components have to be integrated at safe locations in the vehicle. Finally, a comparatively slow disconnection of the electrical system in the course of the accident-related progressing deformations of parts of a body can lead to short circuits, by way of which the, for example, post-crash safety functions could be impaired or rendered inoperative. Thermal events or a HV contact likewise cannot be excluded.

In a manner only indicated in FIG. 1, a discharging of the high-voltage intermediate circuit 3 can therefore be added to an—at least single-pole—electrical isolation of the storage battery 2 and the high-voltage intermediate circuit 3, as symbolized in FIG. 1 by an electrical resistor $R_e$. In the present exemplary embodiment, said resistor $R_e$ is provided as part of an isolation apparatus 5 and is designed to be able to withstand high currents over a short period in order to thereby guarantee a defined and effective discharging of the high-voltage intermediate circuit 3 after isolation from the storage battery 2.

Figure 2:
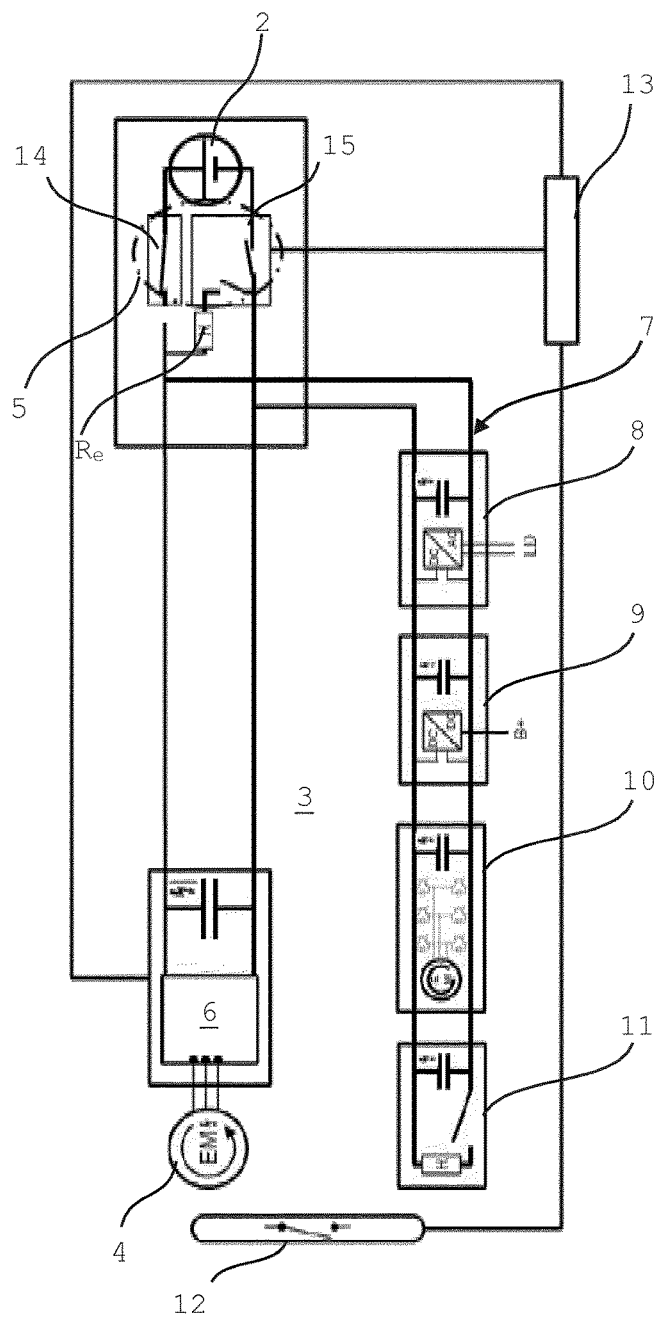
FIG. 2 is a more detailed illustration of an apparatus as per FIG. 1.

FIG. 2 discloses a detailed illustration of an apparatus as per FIG. 1. This indicates a wide branching of the HV intermediate circuit 3, which is connected to the motor/generator unit 4 by means of a power electronics system 6 having IGBT or MOSFET elements in an inverter and is connected to the storage battery 2 by means of an isolating apparatus 5 according to the invention. In this case, by way of example, a charging device 8 having a charging socket LD, a DC/DC converter 9, an electrical refrigerant compressor 10 and an electrical heating system 11 are arranged in a parallel branch 7 of the HV intermediate circuit 3. In various loads, electrical energy E is thus buffer-stored in each case, as indicated in FIG. 2 by the voltage arrows or lightning bolts on capacitors, which represents a dangerous residual charge of the HV intermediate circuit 3.

Figure 3:
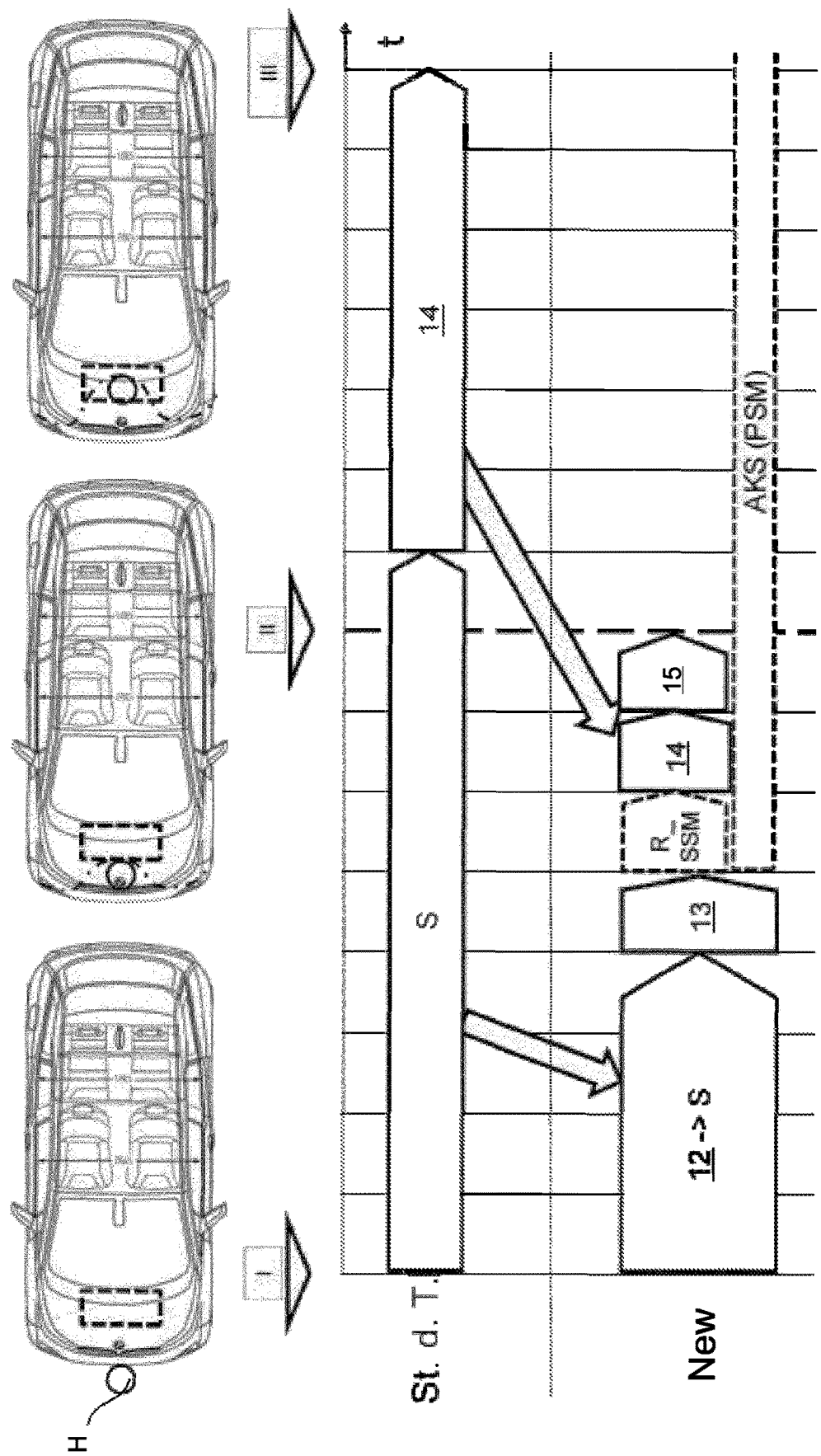
FIG. 3 shows a temporal progression of a deformation in the course of a standardized accident scenario with three exemplary instantaneous illustrations with associated method steps of a known and of an inventive method in one embodiment.

A disconnection process as per the present invention is divided into various successive sequences, see FIG. 3. In state I, an obstacle H makes contact for the first time with an exterior of the vehicle 1. First, a corresponding signal S regarding the crash identification is generated by a sensor system 12. In this case, recourse is made to apparatuses and methods according to the prior art and here, for example, the sensor system of a pedestrian protective apparatus or still further sensors are used for the crash detection, which now identifies the crash earlier also for the purpose of the disconnection of the HV system. A sensor concept optimized in a vehicle-specific manner makes it possible to shorten an interval until crash identification.

A signal S for crash identification is fed to a crash control device 13 by sensors 12 and is processed there for subsequent control of the subprocesses. Accordingly, when a current-excited synchronous machine SSM is used, first de-excitation of the magnetic field with feedback of the energy to the storage battery 2, step E_ESM, takes place, then the isolation of the storage battery 2, for example by switch 14, and finally the discharging of the high-voltage intermediate circuit 3 by way of the switch 15 using the high-current discharge resistor $R_e$. In the event of the use of a permanent-magnet synchronous machine PSM, an active short circuit AKS can be maintained continuously, at least as long as movement energy M can still be fed to the HV intermediate circuit 3 by the motor/generator unit 4 in a way converted as electrical energy. Since either a current-excited synchronous machine SSM or a permanent-magnet synchronous machine PSM are provided in the motor/generator unit 4, the corresponding blocks in FIG. 3 are accordingly both illustrated in a dashed manner as alternatives. However, the method is essentially concluded at the same time in both cases or variants.

The processes described above until the accident-related state II is reached are therefore terminated within a very short time after the first contact of the vehicle exterior with the obstacle H. In this case, the HV components are now continuously loaded with force and acceleration, which can lead to damage and short circuits of internal components with one another and/or with parts of the body. In the transition to state III, still further energy-absorbing deformations now take place. While a known isolating process, denoted here by Prior art, is terminated only with said state III being reached, according to the exemplary embodiment described, isolation with reliable discharging of the HV intermediate circuit 3 is terminated as early as in approximately half of this interval.

In order to make possible, in addition to the persisting dangers described above with respect to the prior art, the known restrictions with respect to an arrangement and design of HV components in crash-affected regions of a vehicle:

the disconnection sequence is shortened, see bottom of FIG. 3, and the HV intermediate circuit is also discharged, which for its part can also be performed in two steps.

To this end, known elements, indicated by arrows in FIG. 3, are used again at several locations. This produces a concept chain for the safe integration of HV components in crash regions. This concept therefore permits damage to the HV components, wherein of these subsequently only the HV store or the storage battery 2 (or furthermore all component parts) actively involved in the discharge process are also excluded, such as, for example, a HV connection from the electric machine 4 to the discharge apparatus 5.

First of all, the time required for a reliable crash identification is shortened by the use of an optimized sensor system design. This can be achieved by additional measures, such as, for example, the attachment of a pressure hose and additional acceleration pick-ups. Furthermore, in this example, a pedestrian sensor system is also included, downstream of which at least one further delay sensor is connected for constructing a plausibility check system. The transmitted signal disconnects a recuperation system of the electric motor so that energy is no longer charged from the motor/generator unit 4 to the HV store 2. At the same time, an active short circuit AKS is connected to the motor/generator unit 4 by the inverter 6; as a result, the motor/generator unit 4 cannot feed energy to the HV intermediate circuit. The HV intermediate circuit is the HV DC voltage level to which all the HV components outside of the HV store are connected, see FIG. 2.

When a current-excited synchronous machine SSM is used as electric drive motor 4, the discharging of the excitation circuit thereof is started at the same time, R_SSM. When current no longer flows in the rotor of the SSM, energy can no longer be fed to the HV intermediate circuit 3 even in the case of a destroyed inverter and hence failure of the AKS circuit.

After the recuperation system and the magnetic field have been disconnected when using an SSM in the motor/generator unit 4, the high-voltage intermediate circuit 3 is disconnected. In this context, the HV store or storage battery 2 is isolated at least in a single-pole manner from the HV intermediate circuit 3 by means of an element that electrically isolates in a suitably rapid and reliable manner, such as, for example, a pyrotechnic element. This can be implemented by use of a pyrotechnic isolating element for isolating a conductive contact. Said pyrotechnic isolating element opens significantly faster than a contactor. As a result, the required time is significantly reduced compared to known apparatuses.

Furthermore, directly after the disconnection of the HV store 2, the discharge resistor $R_e$, as a contact conducting in a defined manner, is connected between a positive potential HV+ and a negative potential HV− of the HV intermediate circuit 3. Said contact may only be connected when the HV store 2 is isolated. Otherwise, the HV store 2 would be short-circuited, which can lead to a thermal event with local overheating up to a fire. The strict isolation of said two successive process steps thus has to be ensured by the crash control device 13. At the same time, the above-described overall process has to proceed very quickly. Therefore, instead of a pyrotechnic fuse, a pyrotechnically activated switch 15 is used as the element, which isolates a connection to the HVS and at the same time establishes a connection to the discharge resistor $R_e$. The intermediate circuit is therefore discharged by way of the discharge resistor $R_e$ connected between HV+ and HV−. The discharge resistance $R_e$ is thus dimensioned to be as small as possible in order to achieve the discharging quickly, but large enough the current-carrying capacity of the intermediate circuit is retained.

At the time of impact on the HV components, the HV intermediate circuit 3 is now discharged. However, the electric machine or the motor/generator unit 4 rotates further on account of the continuity of the vehicle movement and maintenance of the kinetic energy M. As a result, kinetic or rotational energy is converted further to electrical energy E and introduced into the HV intermediate circuit 3. In the case of a permanent-magnet synchronous machine PSM, this state remains until the vehicle is at a standstill. In the case of a current-excited synchronous machine SSM, in contrast, this state only remains until the rotor excitation is electrically disconnected. Measures are then taken by the crash control device 13 as follows per the flow chart of FIG. 4. With the identification of a crash based on signals of the sensor system 12, a further procedure will differ depending on a respective drive technology. In the case of a permanent-magnet synchronous machine PSM, an active short circuit AKS is connected in the power electronics system 6. After the isolation of the HV intermediate circuit 3 from the storage battery 2, the discharge resistor $R_e$ is connected at the isolating point between the potentials HV+ and HV− of the HV intermediate circuit 3. The energy E is immediately short-circuited in the HV intermediate circuit 3 by the discharge resistor $R_e$ and can therefore not (or only minimally) disturb the signal on-board power supply system. In the case of a current-excited synchronous machine SSM as the electric machine of the motor/generator unit 4, this is first de-excited, or the magnetic field thereof is reduced, and the energy stored therein is transmitted to the high-voltage store or the storage battery 2. The HV intermediate circuit 3 is then first isolated from the storage battery 2 and the discharge resistor $R_e$ is subsequently connected at the isolating point between the potentials HV+ and HV− of the HV intermediate circuit 3.

If a conductive contact between the HV intermediate circuit 3 and a signal bus is produced, although this branch of the signal bus becomes inactive because it cannot transmit information about this, other branches of the signal bus can execute the post-crash functions in an undisturbed manner and, for example, cancel an eCall. Although the short-circuited signal line is in contact with the HV intermediate circuit, the discharge circuit prevents the infed energy from skipping to another region in the signal bus control device. Therefore, an additional safety layer is thus provided, which actively intervenes if some energy is still located in the intermediate circuit.

An asynchronous machine (ASM) behaves in the context of this safety concept like an SSM. Only in the case of SSMs is the de-excitation of the rotor also performed. A concept according to the invention is thus applicable for all types of motor units.

By way of an apparatus described above for implementing a safety method, the subsequently compiled advantages are realized over known approaches:
(a) HV components, such as, for example, charging devices 8, DC/DC converters 9, inverters, HV cables, HV distributors, air-conditioning compressors 10, electrical heating systems 11, motor/generator units 4, may be destroyed in a crash, since an electrical danger can no longer originate therefrom on account of the system described above. A robust design and/or protected positioning within the vehicle 1 is no longer absolutely necessary.

This measure advantageously involves:
less installation space
less weight
lower costs
components can possibly take up deformation energy themselves.

Only the components that ensure a conductive connection between the motor/generator unit 4 and the discharge circuit or isolating apparatus 5 have to reliably retain said conductive function in the case of a crash event.
(b) substantial maintenance of all of the post-crash measures provided in the vehicle 1, wherein a possible failure of the post-crash functions is reliably prevented.
(c) a risk of possibly catching fire due to short circuit is minimized.
(d) an occupant is reliably protected against contact with voltage-carrying component parts with >60 V.

LIST OF REFERENCE SIGNS

1 Electric vehicle
2 Storage battery/HV store
3 High-voltage or HV intermediate circuit
4 Electric drive motor or generator/motor/generator unit
5 Isolating apparatus
6 Power electronics system
7 Parallel branch of the HV intermediate circuit 3
8 Charging device
9 DC/DC converter
10 Electrical refrigerant compressor
11 Electrical heating system
12 Sensor system
13 Crash control device
14 Contactor at a pole of the storage battery 2
15 Pyrotechnic switch at the second pole of the storage battery 2
AKS Active short circuit (in the case of PSM)
E Electrical energy
E_SSM Excitation current for rotor in the case of SSM
R_SSM De-excitation of the SSM
H Obstacle
HV+/HV− High-voltage potentials between
LD Charging socket
M Mechanical energy of the motor/drivetrain
PSM Permanent-magnet synchronous machine
$R_e$ Discharge resistor
S Signal for crash identification from crash control device 13
SSM Current-excited synchronous machine
V Supply lines to the motor/generator unit 4
V_SSM Connection for current excitation in the case of the use of an SSM The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A safety method for use in a vehicle with heavy current and high-voltage components, in which a storage battery is used as a store of electrical energy and the electrical energy within the vehicle is converted and/or distributed by a HV intermediate circuit, the method comprising the steps of:
receiving, by a controller, a signal indicating a crash detection from sensors disposed in the vehicle;
determining whether a motor/generator of the vehicle is a current-excited synchronous machine or a permanent-magnet synchronous machine;
in response to a determination that the motor/generator is the current-excited synchronous machine, performing a de-excitation of a magnetic field of the current-excited synchronous machine by transferring energy stored in the magnetic field to the storage battery;
in response to a determination that the motor/generator is the permanent-magnet synchronous machine, establishing and continuously maintaining an active short circuit in a power electronics system that is connected between the HV intermediate circuit and the permanent-magnet synchronous machine by which feedback of mechanical energy converted to electrical energy from the motor/generator unit to the HV intermediate circuit is prevented;

after completion of either the performing the de-excitation or the establishing the active short circuit, physically isolating the storage battery from the HV intermediate circuit by a pyrotechnically activated switch; and in response to the physically isolating of the storage battery from the HV intermediate circuit, connecting the HV intermediate circuit to a discharge apparatus by the pyrotechnically activated switch and discharging the HV intermediate circuit;

wherein the discharge apparatus is a high-current resistor having a low electrical resistance dimensioned to be as small as possible in order to achieve discharging of the HV intermediate apparatus as quickly as possible, but large enough such that a current-carrying capacity of the HV intermediate circuit is retained; and wherein the HV intermediate circuit is discharged by the high-current resistor, which is connected between positive and negative potentials of the HV intermediate circuit.

2. The safety method as claimed in claim 1, wherein the vehicle is one of a hybrid, hydrogen or electric vehicle.

3. The safety method as claimed in claim 1, wherein the discharging of the HV intermediate circuit is carried out via an electrical high-current resistor.

4. The safety method as claimed in claim 3, wherein an inverter contained in the HV intermediate circuit is discharged by the electrical high-current resistor.

5. The safety method as claimed in claim 1, wherein an inverter is a constituent part of the HV intermediate circuit.

6. A protective apparatus in a vehicle with heavy current and high-voltage components, comprising:

a storage battery storing electrical energy in the vehicle;

a HV intermediate circuit that converts and distributes the electrical energy within the vehicle;

a crash control device that determines whether a motor/generator of the vehicle is a current-excited synchronous machine or a permanent-magnet synchronous machine, and in response to a determination that the motor/generator is the current-excited synchronous machine, performs a de-excitation of a magnetic field of the current-excited synchronous machine by transferring energy stored in the magnetic field to the storage battery, and in response to a determination that the motor/generator is the permanent-magnet synchronous machine, establishes and continuously maintains an active short circuit in a power electronics system that is connected between the HV intermediate circuit and the permanent-magnet synchronous machine by which feedback of mechanical energy converted to electrical energy from the motor/generator unit to the HV intermediate circuit is prevented, after completion of either the de-excitation of the magnetic field or establishment of the active short circuit, and coordinates a staged disconnection of an electrical energy supply system in response to receiving a signal indicating a crash detection from sensors disposed in the vehicle; and a pyrotechnically activated switch operatively configured to physically isolate the storage battery from the HV intermediate circuit in response to completion of either the de-excitation of the magnetic field or the establishment of the active short circuit, and, in response to physical isolation of the storage battery from the HV intermediate circuit, the pyrotechnically activated switch connects the HV intermediate circuit to a discharge apparatus that discharges the HV intermediate apparatus;

wherein the discharge apparatus is a high-current resistor having a low electrical resistance dimensioned to be as small as possible in order to achieve discharging of the HV intermediate apparatus as quickly as possible, but large enough such that a current-carrying capacity of the HV intermediate circuit is retained; and wherein the HV intermediate circuit is discharged by the high-current resistor, which is connected between positive and negative potentials of the HV intermediate circuit.

7. The protective apparatus as claimed in claim 6, wherein the vehicle is one of a hybrid or electric vehicle.

8. The protective apparatus as claimed in claim 6, wherein the discharge apparatus is connected to an inverter of the HV intermediate circuit.

9. A hybrid or electric vehicle, comprising:

a motor/generator unit; and a protective apparatus as claimed in claim 6, wherein the motor/generator unit is operatively coupled with the HV intermediate circuit.

10. A hybrid or electric vehicle having heavy current and high-voltage components, in which a storage battery stores electrical energy, and electrical energy within the vehicle is converted and/or distributed by a HV intermediate circuit, the vehicle comprising:

a control unit operatively configured to carry out a procedure of:

receiving a signal indicating a crash detection from sensors disposed in the vehicle;

determining whether a motor/generator of the vehicle is a current-excited synchronous machine or a permanent-magnet synchronous machine;

in response to a determination that the motor/generator is the current-excited synchronous machine, performing a de-excitation of a magnetic field of the current-excited synchronous machine by transferring energy stored in the magnetic field to the storage battery;

in response to a determination that the motor/generator is the permanent-magnet synchronous machine, establishing and continuously maintaining an active short circuit in a power electronics system that is connected between the HV intermediate circuit and the permanent-magnet synchronous machine by which feedback of mechanical energy converted to electrical energy from the motor/generator unit to the HV intermediate circuit is prevented;

after completion of either the performing the de-excitation or the establishing the active short circuit, physically isolating the storage battery from the HV intermediate circuit by a pyrotechnically activated switch; and connecting the HV intermediate circuit to a discharge apparatus by the pyrotechnically activated switch and discharging the HV intermediate circuit via the discharge apparatus in response to physically isolating the storage battery from the HV intermediate circuit;

wherein the discharge apparatus is a high-current resistor having a low electrical resistance dimensioned to be as small as possible in order to achieve discharging of the HV intermediate apparatus as quickly as possible, but large enough such that a current-carrying capacity of the HV intermediate circuit is retained; and wherein the HV intermediate circuit is discharged by the high-current resistor, which is connected between positive and negative potentials of the HV intermediate circuit.

* * * * *